US011636552B2

(12) United States Patent
Maurer et al.

(10) Patent No.: US 11,636,552 B2
(45) Date of Patent: *Apr. 25, 2023

(54) SYSTEMS AND METHODS FOR ENHANCED PERSONAL PROPERTY REPLACEMENT

(71) Applicant: State Farm Mutual Automobile Insurance Company, Bloomington, IL (US)

(72) Inventors: Greg Maurer, Sachse, TX (US); Timothy Joel Davis, Chicago, IL (US); Amy Engelhorn, Normal, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/673,551

(22) Filed: Feb. 16, 2022

(65) Prior Publication Data

US 2022/0172296 A1    Jun. 2, 2022

Related U.S. Application Data

(63) Continuation of application No. 16/853,334, filed on Apr. 20, 2020, now Pat. No. 11,295,392, which is a (Continued)

(51) Int. Cl.
*G06Q 40/08* (2012.01)
*G06Q 30/0601* (2023.01)
(Continued)

(52) U.S. Cl.
CPC ............ *G06Q 40/08* (2013.01); *G06Q 20/34* (2013.01); *G06Q 30/0625* (2013.01);
(Continued)

(58) Field of Classification Search
CPC ..................................................... G06Q 40/00
(Continued)

(56) References Cited

U.S. PATENT DOCUMENTS 6,324,516 B1 * 11/2001 Shults .................... G06Q 10/10
705/2
6,535,855 B1 *  3/2003 Cahill .................... G06Q 20/00
705/346
(Continued)

FOREIGN PATENT DOCUMENTS

CN         111626536 A     9/2020
CN         113138558 A     7/2021
(Continued)

*Primary Examiner* — Kirsten S Apple
(74) *Attorney, Agent, or Firm* — Armstrong Teasdale LLP

(57) ABSTRACT

A system for enhanced personal property replacement (i) builds a virtual inventory of personal belongings, such as by performing object recognition techniques on mobile device digital images with the customer's permission or affirmative consent; (ii) receives user preferences transmitted from their mobile device; (iii) receives a request from the user to handle an insurance claim after an insurance-related event; (iv) determines items to purchase for the user based upon the user preferences, and/or the extent of damage; and/or (v) transmits, to a retailer remote server a virtual order for the items to be delivered to the user at a temporary (hotel) or permanent (home) address. Insurance claim monies may be used to pay for the items. As a result, after an event (e.g., fire, tornado, hurricane), household or other goods may be automatically purchased and delivered to a customer to alleviate the negative impact of the event on their life.

20 Claims, 8 Drawing Sheets

Related U.S. Application Data continuation of application No. 15/243,210, filed on Aug. 22, 2016, now Pat. No. 10,672,079.

(60) Provisional application No. 62/294,674, filed on Feb. 12, 2016.

(51) Int. Cl.
*G06Q 20/34* (2012.01)
*G06V 20/10* (2022.01)
*H04W 84/12* (2009.01)

(52) U.S. Cl.
CPC ......... *G06Q 30/0633* (2013.01); *G06V 20/10* (2022.01); *H04W 84/12* (2013.01)

(58) Field of Classification Search
USPC .................................................... 705/35, 38
See application file for complete search history.

(56) References Cited

U.S. PATENT DOCUMENTS

| | | | |
|---|---|---|---|
| 6,826,536 B1 * | 11/2004 | Forman | G06Q 10/10 705/3 |
| 6,934,692 B1 * | 8/2005 | Duncan | G06Q 20/10 705/26.25 |
| 7,340,401 B1 * | 3/2008 | Koenig | G06Q 40/08 600/300 |
| 7,356,516 B2 * | 4/2008 | Richey | G06Q 30/0253 705/16 |
| 7,395,219 B2 * | 7/2008 | Strech | G06Q 40/00 705/4 |
| 7,467,094 B2 * | 12/2008 | Rosenfeld | G06Q 30/04 340/539.18 |
| 7,657,441 B2 * | 2/2010 | Richey | G06Q 20/403 705/30 |
| 7,941,330 B1 | 5/2011 | Buentello et al. | |
| 8,140,418 B1 * | 3/2012 | Casey | G06Q 40/02 709/227 |
| 8,289,160 B1 * | 10/2012 | Billman | G08B 21/18 340/540 |
| 8,311,941 B2 * | 11/2012 | Grant | H04L 67/5651 705/40 |
| 8,340,997 B2 | 12/2012 | Vandrilla | |
| 8,655,683 B2 | 2/2014 | Grundel et al. | |
| 9,057,746 B1 * | 6/2015 | Houlette | G06Q 50/06 |
| 9,152,737 B1 * | 10/2015 | Micali | G01R 21/133 |
| D764,461 S * | 8/2016 | Romanoff | D14/453 |
| 9,443,195 B2 | 9/2016 | Micali et al. | |
| 9,609,003 B1 | 3/2017 | Chmielewski et al. | |
| 9,699,529 B1 | 7/2017 | Petri et al. | |
| 9,739,813 B2 * | 8/2017 | Houlette | G01R 21/133 |
| 9,798,979 B2 | 10/2017 | Fadell et al. | |
| 9,798,993 B2 | 10/2017 | Payne et al. | |
| 9,800,958 B1 | 10/2017 | Petri et al. | |
| 9,892,463 B1 * | 2/2018 | Hakimi-Boushehri | H04L 12/2823 |
| 9,928,553 B1 | 3/2018 | Harvey et al. | |
| 9,942,630 B1 | 4/2018 | Petri et al. | |
| 9,978,033 B1 | 5/2018 | Payne et al. | |
| 10,102,584 B1 | 10/2018 | Devereaux et al. | |
| 10,142,394 B2 | 11/2018 | Chmielewski et al. | |
| 10,198,771 B1 | 2/2019 | Madigan et al. | |
| 10,296,978 B1 | 5/2019 | Corder et al. | |
| 10,332,059 B2 | 6/2019 | Matsuoka et al. | |
| 10,469,282 B1 | 11/2019 | Konrardy et al. | |
| 10,565,541 B2 | 2/2020 | Payne et al. | |
| 10,586,177 B1 | 3/2020 | Choueiter et al. | |
| 10,664,922 B1 | 5/2020 | Madigan et al. | |
| 10,699,346 B1 | 6/2020 | Corder et al. | |
| 10,699,348 B1 | 6/2020 | Devereaux et al. | |
| 10,726,494 B1 | 7/2020 | Shah et al. | |
| 10,735,829 B2 | 8/2020 | Petri et al. | |
| 10,740,691 B2 | 8/2020 | Choueiter et al. | |
| 10,750,252 B2 | 8/2020 | Petri et al. | |
| 10,796,557 B2 | 10/2020 | Sundermeyer et al. | |
| 10,802,477 B1 | 10/2020 | Konrardy et al. | |
| 10,804,700 B2 | 10/2020 | Cohen et al. | |
| 10,818,105 B1 | 10/2020 | Konrardy et al. | |
| 10,907,844 B2 | 2/2021 | Ribbich et al. | |
| 11,003,334 B1 | 5/2021 | Conway et al. | |
| 11,017,480 B2 | 5/2021 | Shah et al. | |
| 11,049,189 B2 | 6/2021 | Shah et al. | |
| 11,100,594 B1 | 8/2021 | West et al. | |
| 11,164,257 B1 | 11/2021 | Devereaux et al. | |
| 11,232,873 B1 | 1/2022 | Aspro et al. | |
| 11,277,465 B2 | 3/2022 | Chmielewski et al. | |
| 11,348,193 B1 | 5/2022 | Konrardy et al. | |
| 11,417,212 B1 | 8/2022 | Farooqui et al. | |
| 2002/0072944 A1 | 6/2002 | Artinger | |
| 2003/0163397 A1 | 8/2003 | Mayo | |
| 2003/0233292 A1 * | 12/2003 | Richey | G06Q 40/12 705/28 |
| 2004/0153382 A1 * | 8/2004 | Boccuzzi | H04M 15/73 705/34 |
| 2005/0044033 A1 | 2/2005 | Gelson et al. | |
| 2005/0251427 A1 * | 11/2005 | Dorai | G06Q 40/08 705/4 |
| 2006/0253351 A1 | 11/2006 | Keaney | |
| 2006/0271456 A1 * | 11/2006 | Romain | G06Q 40/00 705/67 |
| 2008/0059351 A1 * | 3/2008 | Richey | G06Q 20/20 705/35 |
| 2008/0177581 A1 | 7/2008 | Artinger | |
| 2009/0265193 A1 | 10/2009 | Collins et al. | |
| 2010/0027777 A1 * | 2/2010 | Gupta | H04M 3/42195 379/210.01 |
| 2010/0179837 A1 | 7/2010 | Artinger | |
| 2011/0173122 A1 * | 7/2011 | Singhal | G06Q 20/42 705/44 |
| 2011/0213628 A1 | 9/2011 | Peak et al. | |
| 2011/0218827 A1 * | 9/2011 | Kenefick | G06Q 40/08 705/4 |
| 2011/0238564 A1 * | 9/2011 | Lim | G06Q 20/42 705/38 |
| 2011/0251807 A1 * | 10/2011 | Rada | G01D 4/00 702/61 |
| 2011/0276489 A1 * | 11/2011 | Larkin | G06Q 20/20 705/44 |
| 2012/0046973 A1 * | 2/2012 | Eshleman | G06Q 40/08 705/500 |
| 2012/0047072 A1 * | 2/2012 | Larkin | G06Q 20/02 705/44 |
| 2012/0066005 A1 | 3/2012 | Stewart et al. | |
| 2012/0116820 A1 * | 5/2012 | English | G06Q 40/08 705/4 |
| 2012/0237908 A1 * | 9/2012 | Fitzgerald | H04W 4/029 434/236 |
| 2012/0275651 A1 | 11/2012 | Brown | |
| 2012/0330690 A1 | 12/2012 | Goslinga et al. | |
| 2013/0073321 A1 * | 3/2013 | Hofmann | G06Q 10/10 705/4 |
| 2013/0166325 A1 * | 6/2013 | Ganapathy | G06Q 40/08 705/4 |
| 2013/0304514 A1 * | 11/2013 | Hyde | G06Q 40/08 705/4 |
| 2014/0058854 A1 * | 2/2014 | Ranganath | G06Q 20/405 705/16 |
| 2014/0257871 A1 * | 9/2014 | Christensen | G06Q 40/08 705/4 |
| 2014/0266669 A1 * | 9/2014 | Fadell | G08B 27/003 340/501 |
| 2014/0310162 A1 | 10/2014 | Collins | |
| 2014/0316824 A1 | 10/2014 | Tkatch | |
| 2015/0032480 A1 * | 1/2015 | Blackhurst | G06Q 40/08 705/4 |
| 2015/0061859 A1 * | 3/2015 | Matsuoka | G08B 25/008 340/501 |
| 2015/0187019 A1 * | 7/2015 | Fernandes | G06Q 40/08 705/4 |
| 2015/0227864 A1 | 8/2015 | Payne | |

(56) References Cited

U.S. PATENT DOCUMENTS

| | | |
|---|---|---|
| 2015/0347910 A1 | 12/2015 | Fadell et al. |
| 2018/0218297 A1 | 8/2018 | Payne |
| 2019/0251520 A1 | 8/2019 | Bentley, III |
| 2020/0311825 A1 | 10/2020 | Shah |
| 2020/0320639 A1 | 10/2020 | Shah |
| 2021/0279811 A1 | 9/2021 | Waltman |
| 2021/0312789 A1 | 10/2021 | Linn |
| 2022/0101275 A1 | 3/2022 | Aspro |

FOREIGN PATENT DOCUMENTS

| | | |
|---|---|---|
| EP | 1220131 A2 | 7/2002 |
| JP | 2003157357 A | 5/2003 |
| KR | 20150129845 A | 11/2015 |
| WO | 2001098914 A1 | 12/2001 |
| WO | 2014159131 A2 | 10/2014 |
| WO | 2016081511 A2 | 5/2016 |
| WO | 2021087185 A1 | 5/2021 |

\* cited by examiner

SYSTEMS AND METHODS FOR ENHANCED PERSONAL PROPERTY REPLACEMENT

RELATED APPLICATION

This application is a continuation of and claims priority to U.S. patent application Ser. No. 16/853,334, filed on Apr. 20, 2020, which is a continuation of and claims priority to U.S. patent application Ser. No. 15/243,210, filed on Aug. 22, 2016, which issued as U.S. Pat. No. 10,672,079 on Jun. 2, 2020, which claims priority to U.S. Provisional Patent Application No. 62/294,674, filed Feb. 12, 2016, and is related to co-pending U.S. patent application Ser. No. 16/834,985, filed on Mar. 30, 2020, which is a continuation of and claims priority to U.S. patent application Ser. No. 15/243,225, filed on Aug. 22, 2016, which issued as U.S. Pat. No. 10,672,080 on Jun. 2, 2020, which claims priority to U.S. Provisional Patent Application No. 62/294,674, filed Feb. 12, 2016, the contents of which are hereby incorporated by reference, in their entirety and for all purposes, herein.

FIELD OF THE INVENTION

The present disclosure relates to enhanced personal property replacement and, more particularly, to a network-based system and method for generating an index of personal property owned by a user, preparing user preferences of products, receiving a claim trigger event, and/or submitting an order to a third party to deliver equivalent products for the user based in part on the index and the user preferences, wherein the index is generated from a network signal and a prior purchase signal.

BACKGROUND

The period of time following a homeowner's or renter's insurance claim may be a disruptive and confusing one for the individual affected. Those affected may be physically displaced from their residence, perhaps permanently. Their new or temporary residence may be unfurnished, and/or not stocked with daily essentials. Insurance claims against "loss of use" and replacement of property damaged in the loss event may cover the financial burden of the loss, but there is a significant amount of time and energy that must be spent by the policyholder on making arrangements for the replacement of their lost property. Additionally, a time lag may occur between the out-of-pocket expenses incurred by a policyholder and the eventual payment of claims.

In the event of a loss of the sort that causes an insured to vacate their home or other primary residence, insurance agents may cut checks for initial expected "loss of use" claims, which may be used for temporary housing and other essentials. Claim disbursements for personal property may be typically made after a claim adjuster has made an assessment of the totality of a loss based upon the policy provisions. For example, some policy provisions include, but are not limited, to the personal property coverage amount, as well as any loss settlement provisions such as "actual cash value" vs. "replacement cost" provisions. Personal property inventory forms (PPIFs) may be used (if they were previously completed by a policyholder and agent) to expedite the process of claims adjustment and property replacement. However, the time and effort of the property replacement—i.e. shopping for furniture and other goods—is still a task the policyholder must perform.

BRIEF SUMMARY

The present embodiments may relate to systems and methods for providing enhanced personal property replacement. A claim processing system, as described herein, may include a claim processing ("CP") computer device that is in communication with a user computer device and a retailer computer device. The CP computer device may be configured to receive wireless traffic from a Wi-Fi network associated with the user, identify one or more devices connected to the Wi-Fi network based upon the wireless traffic, generate a listing of a first plurality of items based upon the identified one or more devices, generate an index of the first plurality of items based upon the listing, receive a plurality of user preferences transmitted from a user computer device associated with the user, receive a request from the user to cover a claim, determine a second plurality of items for the user based upon the claim, the plurality of user preferences, and the index, and/or transmit, to a retailer computer device associated with a retailer, an order for the determined second plurality of items with the retailer to be delivered to the user at an address associated with the user.

In one aspect, a computer system for enhanced personal property replacement may be provided. The computer system may include at least one processor in communication with at least one memory device. The at least one processor may be configured or programmed to: (1) receive a listing of a first plurality of items associated with a user; (2) generate an index of the first plurality of items based upon the listing; (3) receive a plurality of user preferences transmitted from a user computer device associated with a user; (4) receive a request from the user to cover or handle an insurance claim; (5) determine a second plurality of items for the user based upon the claim, the plurality of user preferences, and/or the index; and/or (6) transmit, to a retailer computer device associated with a retailer, an order for the determined second plurality of items with the retailer to be delivered to the user at an address associated with the user to facilitate quickly and automatically provided household or other goods to the user after their life is negatively impacted by an insurance-related event (e.g., fire, tornado, or hurricane). The computer system may have additional, less, or alternate functionality, including that discussed elsewhere herein.

In another aspect, a computer-based method for enhanced personal property replacement may be provided. The method may be implemented on a claim processing ("CP") server that includes at least one processor in communication with at least one memory device. The method may include: (1) receiving, at the CP server, a listing of a first plurality of items associated with a user; (2) generating, at the CP server, an index of the first plurality of items based upon the listing; (3) receiving, at the CP server, at a plurality of user preferences transmitted from a user computer device associated with a user; (4) receiving, at the CP server, a request from the user to cover a claim; (5) determining, by the CP server, a plurality of items for the user based upon the claim, the plurality of user preferences, and the index; and/or (6) transmitting, from the CP server to a retailer computer device associated with a retailer, an order for the determined plurality of items with the retailer to be delivered to the user at an address associated with the user to facilitate prompt delivery of household or other goods to the user after an insurance-related event. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) receive a listing of a first plurality of items associated with a user; (2) generate an index of the first plurality of items based upon the listing; (3) receive a plurality of user preferences transmitted from a user computer device associated with a user; (4) receive a request from the user to cover a claim; (5) determine a second plurality of items for the user based upon the claim, the plurality of user preferences, and the index; and/or (6) transmit, to a retailer computer device associated with a retailer, an order for the determined second plurality of items with the retailer to be delivered to the user at an address associated with the user. The computer-executable instructions may direct additional, less, or alternate functionality, including that discussed elsewhere herein.

In still another aspect, a computer system for enhanced personal property replacement may be provided. The computer system may include at least one processor in communication with at least one memory device. The at least one processor may be programmed to (1) receive a plurality of user preferences transmitted from a user computer device associated with a user; (2) receive a request from the user to cover a claim; (3) determine a first plurality of items for the user based upon the claim and the plurality of user preferences; and/or (4) transmit, to a retailer computer device associated with a retailer, an order for the determined first plurality of items with the retailer to be delivered to the user at an address associated with the user to facilitate delivery of household or other goods after an insurance-related event. The computer system may include additional, less, or alternate functionality, including that discussed elsewhere herein.

In a different aspect, a computer-based method for enhanced personal property replacement may be provided. The method may be implemented on a claim processing ("CP") server that includes at least one processor in communication with at least one memory device. The method may include (1) receiving, at the CP server, at a plurality of user preferences transmitted from a user computer device associated with a user; (2) receiving, at the CP server, a request from the user to cover a claim; (3) determining, by the CP server, a plurality of items for the user based upon the claim and the plurality of user preferences; and/or (3) transmitting, from the CP server to a retailer computer device associated with a retailer, an order for the determined plurality of items with the retailer to be delivered to the user at an address associated with the user. The method may include additional, less, or alternate actions, including those discussed elsewhere herein.

In a further aspect, at least one non-transitory computer-readable storage media having computer-executable instructions embodied thereon may be provided. When executed by at least one processor, the computer-executable instructions may cause the processor to receive a plurality of user preferences transmitted from a user computer device associated with a user, receive a request from the user to cover a claim, determine a first plurality of items for the user based upon the claim and the plurality of user preferences, and transmit, to a retailer computer device associated with a retailer, an order for the determined first plurality of items with the retailer to be delivered to the user at an address associated with the user. The instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
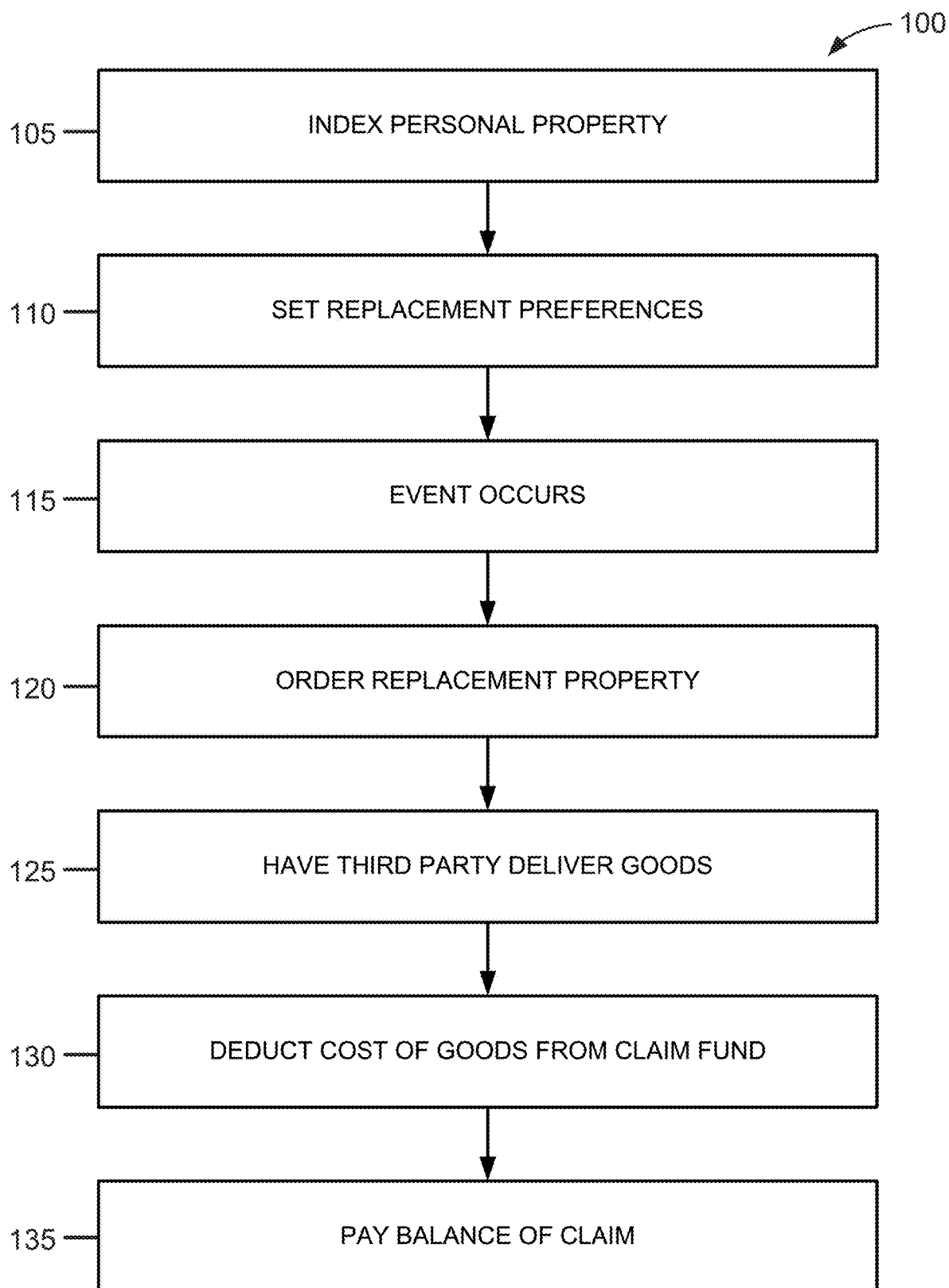
FIG. 1 illustrates a flow chart of an exemplary process for processing personal property replacement claims including automatic ordering of furniture and other household goods in accordance with one embodiment of this disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for processing personal property replacement claims including automatic ordering of furniture and other household goods. In an exemplary embodiment, the process is performed by a claims processing ("CP") computer device, also known as a claims processing ("CP") server. In the exemplary embodiment, the policyholder has worked with the insurance provider associated with the policy to list all of the personal property owned by the policyholder that would be covered by the insurance policy prior to any event occurring that causes a loss for an insurance policyholder. For instance, a user may generate a list of personal property, such as by capturing images or video of household belongings using their mobile device, and then having a processor use object recognition techniques on the images or video captured by a mobile device identify individual items. Based upon this list, an index may be generated by the CP server. In other embodiments, the index may be generated from signals from devices that are connected to the CP server through the Internet.

In a first example, the CP server may receive information from one or more smart home devices in the policyholder's residence. In this example, the CP server may determine which components where connected to the smart home system, such as, but not limited to, smart locks, furnaces, air conditioners, thermostats, light bulbs, and any other device run through the smart home device, such as through a smart home hub. In a second example, the CP server may receive information about the devices connected to the Wi-Fi network at the policyholder's residence. In this example, the CP server may receive message traffic data, log data, or other data that allows the CP server to identify the devices that connected to the policyholder's network. These devices may include laptops, desktops, tablets, smartphones, IP cameras, smart refrigerators, smart stoves, and other wireless connected devices. The CP server may be able to determine a make and model associated with each electronic device that connected to the network, such as by PINs, or identification or manufacturer numbers.

In another example, the CP server receives data from computer devices associated with one or more retailers to determine household goods that the policyholder has purchased. The CP server may use the data to determine the purchases made by the policyholder over various periods of time. This data may include makes, models, and quantities of household goods purchased by the policyholder. In yet another example, the policyholder may take video or pictures of his house and possessions to show what he currently owns and is keeping in the house and transmit that video to the CP server to assist in generating the index. The CP server may then, for example, run pattern recognition, object recognition, optical character recognition, or other machine learning techniques to identify goods, and current quality, quantify, or status of the goods.

The policyholder may also prepare lists of his/her possessions, such as either manually or by using his or her mobile device and image analysis. These possessions may include household goods owned by the policyholder. It is important to have these lists made up before a loss occurs, as it may be hard for the policyholder to remember everything after the fact. In addition, performing this index prior to a loss helps to prevent the policyholder from listing items as lost that the policyholder didn't own. These listings are also important for determining the replacement value and the depreciated value of the reported lost items, and/or facilitate more accurate risk assessment and claim handling.

In addition, the policyholder may determine their replacement preferences in the case of a loss occurring. The policyholder may list his/her replacement preferences for when a loss occurs, which are stored by the CP server and/or their mobile devoice. For example, the policyholder may determine that he would want to replace a lost dining room set with the exact same set, if the original set was lost or damaged, for example in a fire. The policyholder may also decide that he would want to replace his plates with the exact set that he had before the loss event.

At some point an event occurs that causes a loss for the policyholder. This event could be any event that results in a loss for the policyholder that causes the policyholder to submit a claim. For example, the event may be a fire or storm damage to the policyholder's house. This event may cause the policyholder to lose his residence and have to move to another address, either permanently or temporarily. In another example, the loss could be a partial loss. For example, either where the policyholder's home is only partially damaged, or where the policyholder's vehicle was broken into and several items were taken out of the vehicle.

The CP server initiates an order for replacement property for the policyholder. This replacement property is delivered to the policyholder from a third party. In the example of the house fire, the replacement property may a replacement dining room set. Or the replacement property may be household essentials, which may be goods that are used up by the policyholder in everyday life, such as toilet paper, laundry detergent, trash bags, and towels. In the vehicle example, the replacement property may be replacement items for all of the items stolen from the vehicle. In another embodiment, the replacement property may include both durable goods and household essentials, which may be goods that allow the policyholder to live in his temporary residence, such as plates and utensils. The third party may be a retailer, such as a big box store, a grocery store, or some other store that the insurance provider has partnered with.

The third party may receive the order from the CP server and ship the replacement goods to the policyholder. For example, if the policyholder is living in a new house, then the replacement goods may be shipped directly there. Or if the policyholder is living in a temporary residence, such as an extended stay hotel, the replacement goods would be shipped to that hotel.

When a claim is initially processed, the CP server may create a claim fund based upon the policy and the items lost. The CP server may adjust the claim fund based upon the items lost, the availability of direct replacements, the replacement costs for items lost, and/or the depreciation associated with the lost items. For each order of replacement property shipped to the policyholder, the CP server may reduce the claim fund based upon the cost of the replacement property shipped to the policyholder. In some embodiments, the entire cost of the replacement property may be deducted from the claim fund. In other embodiments, the CP server may only deduct a portion of the cost of the replacement property from the claim fund. The CP server may transfer the remaining balance from the claim fund to the policyholder.

At least one of the technical problems addressed by this system may include: (i) improving speed and efficiency of replacing items covered by an insurance claim; (ii) improving accuracy and reducing fraud (or buildup) on determining items owned by a policyholder prior to a loss event; (iii) saving time for policyholder in replacing lost items; (iv) saving time for policyholder in purchasing household essentials after a loss event; and/or (v) streamlining the item replacement process to faster process claims.

The technical effect achieved by this system may be at least one of: (i) automated detection of items owned by the policyholder; (ii) automated ordering of replacement items based upon items owned by policyholder and policyholder preferences; (iii) automated and/or simplified calculation of claim amounts; (iv) automated and/or simplified alteration of final claim amounts; (v) improved speed in processing claims; (vi) improved speed in responding to policyholder needs; (vii) improved speed in generating, processing, and/or issuing claims and/or claim disbursements after an insurance claim event; and/or (viii) more accurate replacement cost determination and ordering.

The methods and systems described herein may be implemented using computer programming or engineering techniques including computer software, firmware, hardware, or any combination or subset thereof, wherein the technical effects may be achieved by performing at least one of the following steps: (a) receiving, at a claim processing server, a plurality of user preferences transmitted from a user computer device associated with a user; (b) receiving, at the claim processing server, a request from the user to cover a claim; (c) determining, at the claim processing server, a plurality of items for the user based upon the claim and the plurality of user preferences; and/or (d) transmitting, from the claim processing server to a retailer computer device associated with a retailer, an order for the determined plurality of items with the retailer to be delivered to the user at an address associated with the user.

Exemplary Process for Processing Personal Property Replacement Claims

FIG. 1 depicts a flow chart of an exemplary process 100 for processing personal property replacement claims including automatic ordering of household goods. Examples of household goods may include, but are not limited to, furniture, electronics, kitchen utensils, bathroom products (soap, shampoo, towels, shower curtains, etc.), and any other products that may be used by or consumed within a household.

Figure 2:
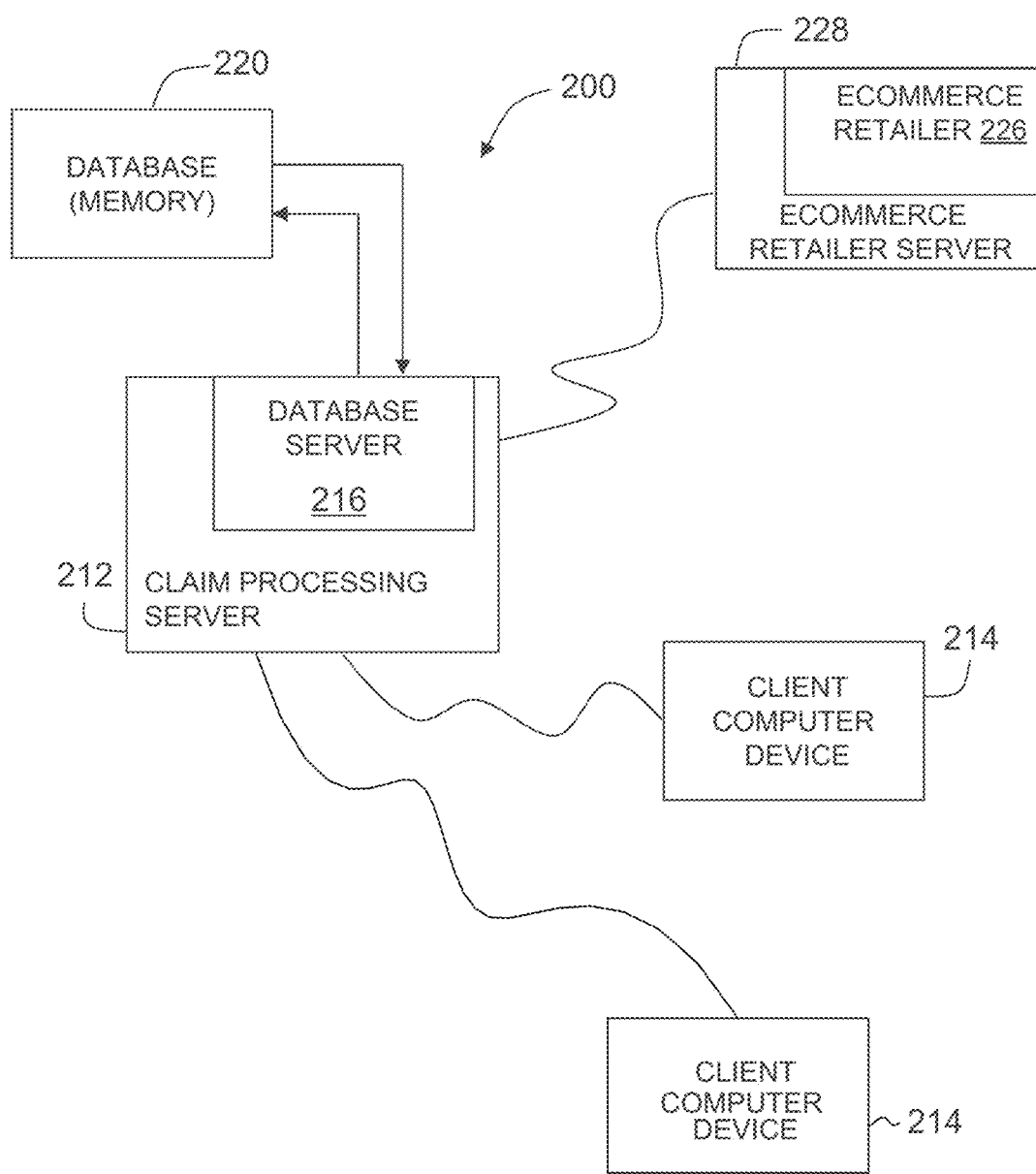
FIG. 2 illustrates a simplified block diagram of an exemplary system for implementing the process shown in FIG. 1.

In the exemplary embodiment, process 100 may be performed by a claims processing ("CP") computer device, also known as a claims processing ("CP") server 212 (shown in FIG. 2). In one embodiment, the policyholder has worked with the insurance provider associated with the policy to list all of the personal property owned by the policyholder that would be covered by the insurance policy prior to any event occurring that causes a loss for an insurance policyholder.

For instance, the policyholder and/or an insurance agent may walk about a home with their mobile device, and acquire pictures, images, or video of the home and household goods. The mobile device may perform object recognition, optical character recognition, pattern recognition, or other machine learning techniques to identify and characterize various goods within the home. Additionally or alternatively, the image data may be transmitted via wireless communication or data transmission over one or more radio frequency links to a remote server, and the remote server may analyze the image data to identify goods, such as using objection recognition or machine learning techniques.

A virtual list of household and other goods may be generated by the mobile device or the remote server, such as the CP server 212. Based upon this list, an index may be generated 105 by CP server 212. In other embodiments, the index may be generated from signals from devices that are connected to CP server 212 through the Internet.

In a first example, CP server 212 may receive information from one or more smart home devices in the policyholder's residence. In this example, CP server 212 may determine which components where connected to the smart home system, such as, but not limited to, smart locks, furnaces, air conditioners, thermostats, light bulbs, and any other device run through the smart home device, such as through a smart home hub. In a second example, CP server 212 may receive information about the devices connected to the Wi-Fi network at the policyholder's residence. In this example, CP server 212 may receive message traffic data, log data, or other data that allows CP server 212 to identify the devices that connected to the policyholder's network. These devices may include laptops, desktops, tablets, smartphones, IP cameras, smart refrigerators, smart stoves, and other wireless connected devices or mobile devices. CP server 212 may be able to determine a make and model associated with each electronic device that is connected to the network. In another example, CP server 212 may receive data from computer devices associated with one or more retailers to determine household goods that the policyholder has historically purchased either through the one or more retailers' online presences or through their actual physical locations (i.e., brick and mortar stores).

CP server 212 may use the data to determine the purchases made by the policyholder over various periods of time. This data may include makes, models, and quantities of household goods purchased by the policyholder. In yet another example, the policyholder may take video or pictures of his house and possessions to show what he currently owns and is keeping in the house, and transmit that video to CP server 212 to assist in generating the index, such as by performing object recognition, optical character recognition, or machine learning techniques on the image data of the house and possessions.

The policyholder may also prepare lists of his/her possessions, such as manually created lists, or virtual lists created via a mobile device or computing device. These possessions may include household goods owned by the policyholder. It is important to have these lists made up before a loss occurs, as it may be hard for the policyholder to remember everything after the fact. In addition, these listings may also be important for determining the replacement value and the depreciated value of the reported lost items.

In addition, the policyholder may determine what his/her replacement preferences are in the case of a loss occurring. The policyholder may list 110 replacement preferences for when a loss occurs, which may be stored by CP server 212. For example, the policyholder may determine that he/she would want to replace a lost dining room set with the exact same set, if the original set was lost, for example in a fire. The policyholder may also decide that he/she would want to replace his plates with the exact set that he/she had before the loss event.

At some point an event may occur 115 that causes a loss for the policyholder. This event could be any event that results in a loss for the policyholder that causes the policyholder to submit a claim. For example, the event may be a fire or storm damage to the policyholder's house. This event may cause the policyholder to lose his/her residence and have to move to another address, either permanently or temporarily. In another example, the loss could be a partial loss. For example, either where the policyholder's home is only partially damaged, or where the policyholder's vehicle was broken into and several items were taken out of the vehicle.

CP server 212 may initiate 120 an order for replacement property for the policyholder. This replacement property may be delivered 125 to the policyholder from a third party. In the example of the house fire, the replacement property may be a replacement dining room set. Or the replacement property may be household essentials, which are goods that are used up by the policyholder in everyday life, such as toilet paper and trash bags. In the vehicle example, the replacement property may be replacement items for all of the items stolen from the vehicle. In another embodiment, the replacement property may include both durable goods and household essentials, which may be goods that allow the policyholder to live in his temporary residence, such as plates and utensils and groceries. The third party may be a retailer, such as a big box store or grocery store. The third party receives the order from CP server 212 and ships the replacement goods to the policyholder. For example, if the policyholder is living in a new house, then the replacement goods may be shipped directly there. Or if the policyholder is living in a temporary residence, such as an extended stay hotel, the replacement goods would be shipped to that hotel.

When a claim is initially processed, CP server 212 creates a claim fund based upon the policy and the items lost. CP server 212 may adjust the claim fund based upon the items lost, the availability of direct replacements, the replacement costs for items lost, and/or the depreciation associated with the lost items.

For each order of replacement property shipped to the policyholder, CP server 212 may reduce 130 the claim fund based upon the cost of the replacement property shipped to the policyholder. In some embodiments, the entire cost of the replacement property may be deducted from the claim fund. In other embodiments, CP server 212 may only deduct a portion of the cost of the replacement property from the claim fund. CP server 212 may transfer 135 the remaining balance from the claim fund to the policyholder.

Exemplary Computer Network

FIG. 2 depicts a simplified block diagram of an exemplary system 200 for implementing process 100 shown in FIG. 1. In the exemplary embodiment, system 200 may be used for determining items to order for a user, placing the order, and updating the pending claim based upon the order. As described below in more detail, claim processing ("CP") server 212 may be configured to receive a plurality of user preferences transmitted from a user computer device associated with a user, receive a request from the user to cover a claim, determine a first plurality of items for the user based upon the claim and the plurality of user preferences, and/or transmit, to a retailer computer device associated with a retailer, an order for the determined first plurality of items with the retailer to be delivered to the user at an address associated with the user.

In the exemplary embodiment, client computer devices 214 are computers that include a web browser or a software application, which enables client computer devices 214 to access CP server 212 using the Internet. More specifically, client computer devices 214 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Client computer devices 214 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 216 may be communicatively coupled to a database 220 that stores data. In one embodiment, database 220 may include listings of household items owned by the policyholder, where the household items include durable goods like furniture and household essentials like toilet paper, trash bags, and groceries; claims received from the policyholder; and/or preferences provided by the policyholder. In the exemplary embodiment, database 220 may be stored remotely from CP server 212. In some embodiments, database 220 may be decentralized. In the exemplary embodiment, a person may access database 220 via client computer devices 214 by logging onto CP server 212, as described herein.

CP server 212 may be communicatively coupled with the client computer devices 214. In some embodiments, CP server 212 may be associated with, or is part of a computer network associated with an insurance provider, or in communication with the insurance provider's computer network (not shown). In other embodiments, CP server 212 may be associated with a third party and is merely in communication with the insurance provider's computer network.

One or more ecommerce retailer servers 228 may be communicatively coupled with CP server 212. The one or more ecommerce retailer servers 228 each may be associated with an ecommerce retailer 226. Ecommerce retailer 226 may sell products and services to customers over the Internet. In some embodiments, ecommerce retailer 226 may also sell products and services at a physical location. Customers may purchase products online from ecommerce retailer 226 for delivery to a location chosen by the customer. For example, a customer may purchase an item, such as a book or household item, from an ecommerce retailer 226 through a website hosted on ecommerce retailer server 228. Ecommerce retailer 226 may ship the item to the customer's location, such as the customer's residence. CP server 212 may be coupled to ecommerce retailer server 228 so that CP server 212 may place orders for products from ecommerce retailer 226.

Figure 3:
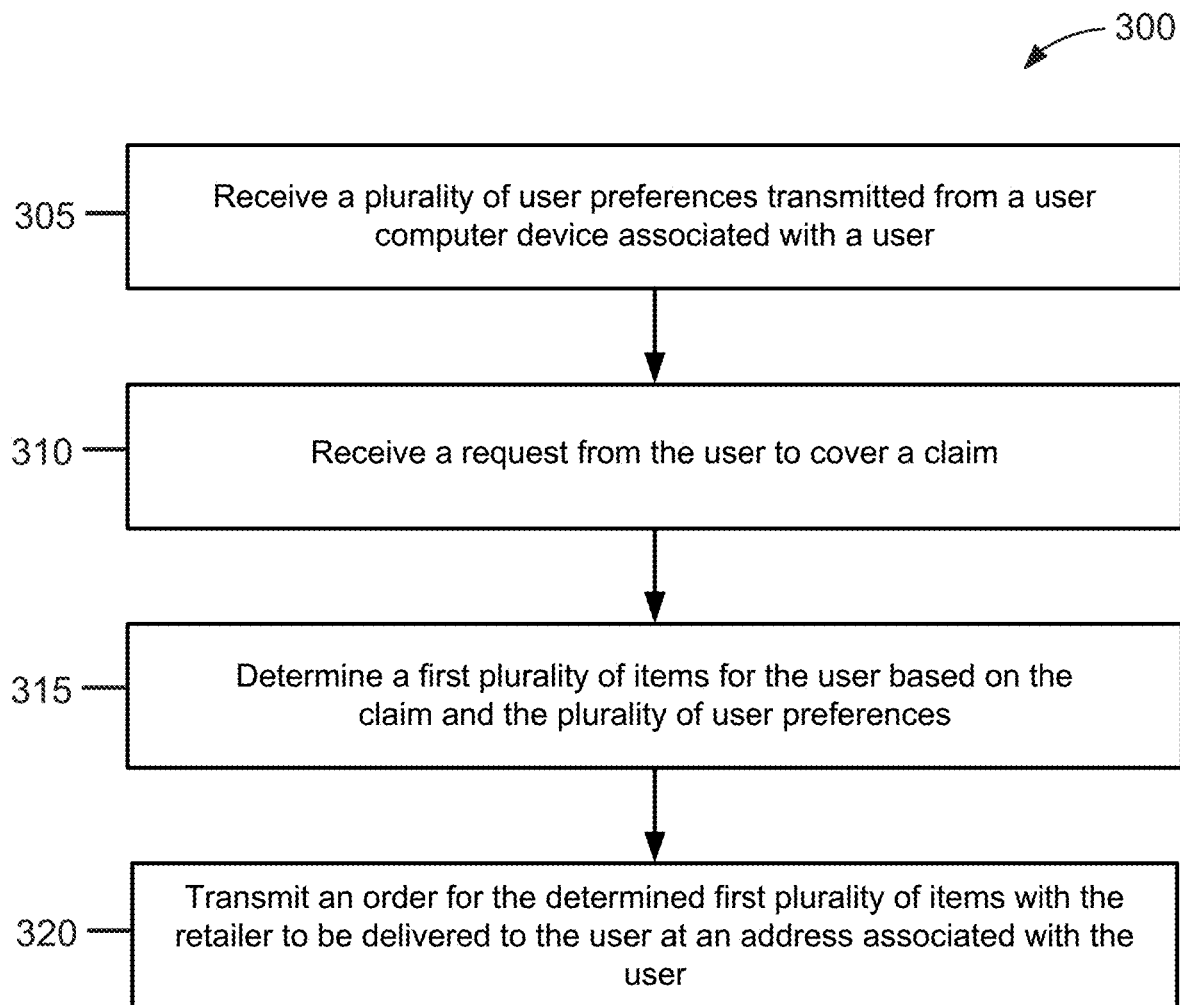
FIG. 3 illustrates a flow chart of an exemplary computer-implemented process for processing personal property replacement claims using the system shown in FIG. 2.

Exemplary Computer-Implemented Method for Processing Personal Property Replacement Claims FIG. 3 depicts a flow chart of an exemplary computer implemented process 300 for processing personal property replacement claims using system 200 shown in FIG. 2. Process 300 may be implemented by a computing device, for example CP server 212 (shown in FIG. 2). In the exemplary embodiment, CP server 212 may be in communication with ecommerce retailer server 228 and client computer device 214 (shown in FIG. 2).

In the exemplary embodiment, CP server 212 may receive 305 a plurality of user preferences transmitted from a user computer device associated with a user (also known herein as a policyholder). In some embodiments, the user may be an insurance agent working on behalf of the policyholder. For example, the user computer device may be client computer device 214. In some embodiments, CP server 212 may receive the user preferences through an application hosted on a user mobile device, such as a smartphone. In other embodiments, CP server 212 may receive the user preferences through a website associated with the insurance provider. User preferences may include, but are not limited to, policyholder address, replacement preferences, and household essentials used by the policyholder, such manufacturers of preferred dish soap, laundry soap, type of towel, type of paper plates and plastic cups, type of silverware or drinking glasses, type of clothes (and sizes), type of toilet paper or paper towels, type of bottled water or soda, type of groceries or snacks (e.g., meat or potato chips), etc. This step may occur during step 110 of process 100, shown in FIG. 1.

The step may also occur after the event has occurred in step 115, shown in FIG. 1. In this situation, the user may enter the policyholder's current address or shipping address. CP server 212 may receive 310 a request from the user to cover a claim. This may occur after the event has occurred in step 115, and the policyholder is making a claim for lost items, such as after a fire, hurricane, tornado, or robbery.

CP server 212 may determine 315 a first plurality of items for the policyholder based upon the claim and the plurality of user preferences. For example, CP server 212 may determine a plurality of items for the policyholder that include everyday household essentials for the policyholder. The user preferences may include brand and quantity information about the items, so that CP server 212 may determine that the policyholder needs 24 rolls of toilet paper and one medium size box of trash bags for a one month stay in temporary housing. In another example, CP server 212 may determine that the policyholder desires to replace his lost or damaged dining room set with the same model set. CP server 212 may determine that the policyholder wants to replace his lost television. However, since the model of television that the policyholder previously owned is no longer being sold, CP server 212 may determine a replacement model of television for the policyholder based upon the previously owned model.

CP server 212 may transmit 320 an order for the determined first plurality of items with ecommerce retailer 226 (shown in FIG. 2) to be delivered to the policyholder at an address associated with the policyholder. CP server 212 may determine the address based upon the user preferences. The policyholder address may be based upon a temporary address where the policyholder is staying after the claim. Or the policyholder address may be the policyholder's permanent residence. Ecommerce retailer 226 may be, for example, a big box store or a grocery store that sells the items determined by the CP server 212. Ecommerce retailer server 228 may be configured to receive orders for products, and to ship or deliver those orders directly to a provided address.

In the exemplary embodiment, CP server 212 may receive a listing of a second plurality of items owned by the policyholder. The second plurality of items may represent the items owned by the policyholder prior to the event occurring 115. In some embodiments, CP server 212 may receive this listing before the event occurs 115. In other embodiments, CP server 212 may receive the listing after the event occurs 115, and some or all of the items in the second plurality of items are the items that the policyholder is looking to make claim for. CP server 212 may store the listing of the second plurality of items in association with the policyholder, potentially in database 220 (shown in FIG. 2). CP server 212 may determine the first plurality of items for the policyholder based upon the claim, the second plurality of items, and/or the plurality of user preferences. By looking at what the policyholder previously owned or claimed to own, CP server 212 may determine which items the policyholder needs replaced. In some embodiments, the second plurality of items represents durable goods that the policyholder owned, such as furniture. The first plurality of items may include both durable goods and household essentials, items that are used up on a regular basis, including groceries or clothes.

CP server 212 compares the items listed in the second plurality of items to those items on a retailer's website. This allows CP server 212 to determine which items the policyholder owned, where to order these items, and/or how much it will cost to replace those items. Based upon the website, by associating the second plurality of items with items on retailer websites, CP server 212 may generate the first plurality of items for the order from the retailer associated with the website. In some embodiments, CP server 212 identifies the items based upon communications with ecommerce retailer server 228.

In one embodiment, CP server 212 may determine which items the policyholder owned is through videos and images provided by the policyholder. CP server 212 may receive pictures or video of the policyholder's residence and possessions. CP server 212 may analyze the pictures or video to recognize one or more items owned by the policyholder, such as by using machine learning, deep learning, object recognitions, pattern recognition, or optical character recognition techniques on image data provided from the policyholder's mobile device. CP server 212 may be able to determine the make and model of television owned by the policyholder based upon one or more images of the TV or a video that the policyholder took. In one embodiment, the images may be personal images and video provided by the policyholder. In other embodiments, the images and video may be professionally produced for the purpose of generating a personal inventory.

In another embodiment, CP server 212 may receive data from a smart home control system to identify items owned by the policyholder. For example, the smart home system associated with the policyholder's residence may provide a listing of the products that are connected to the system, such as video cameras, smart locks, and thermostat controllers. From that list of items, CP server 212 may identify smart home components owned by the policyholder and add those components to the second plurality of items.

In yet another embodiment, CP server 212 may receive data from a Wi-Fi network associated with the policyholder to determine items and devices owned by the policyholder. For example, the Wi-Fi network may provide information about smartphones, tablets, laptops, printers, IP cameras, and other computer devices that have connected to the Wi-Fi and were potentially owned by the policyholder. CP server 212 may then add some or all of these devices to the second plurality of items. In some embodiments, CP server 212 may determine the devices that are connected to the Wi-Fi network based upon network traffic. CP server 212 may determine the make and model of the connected devices based upon information contained in the message traffic.

In still another embodiment, CP server 212 may determine items owned by the policyholder based upon the policyholder's purchase history with an online retailer. For example, CP server 212 may determine that the policyholder purchased a certain type of television or chair from the online retailer. Based upon that purchase, CP server 212 may then add that exact model from that online retailer to the second plurality of items. In some embodiments, the policyholder's purchase history may be provided by the policyholder. In other embodiments, the policyholder's purchase history may be provided after a query from CP server 212 to ecommerce retailer server 228.

In still further embodiments, CP server 212 may determine the household essentials to include in the first plurality of items based upon the policyholder's purchase history from a plurality of retailers. For example, CP server 212 may determine that the policyholder purchases three 100-count boxes of trash bags a year. Based upon this information, CP server 212 may determine that the policyholder uses about 30 trash bags a month and orders a number of trash bags for the policyholder accordingly. CP server 212 may also determine the brand of household essential that the policyholder purchases on a regular basis to know which brand to place in the first plurality of items. In some embodiments, CP server 212 may query a plurality of ecommerce retailer servers 228 to receive a plurality of purchase histories associated with the policyholder.

In further embodiments, CP server 212 may determine the household essentials to include in the first plurality of items based on the policyholder's one-touch reordering devices. For example, if policyholder used a one-touch reordering device to automatically reorder laundry detergent from a retailer. Then CP server 212 may be able to access the brand and quantity information from the reordering preferences that policyholder has setup with the retailer associated with the one-touch reordering device.

In some embodiments, CP server 212 may determine a preliminary claim amount based upon the claim. In other embodiments, CP server 212 may determine the preliminary claim amount based upon the claim and the second plurality of items. As the items are more accurately recorded, the preliminary claim amount may require less adjustment and the process may be potentially streamlined.

Once CP server 212 has determined all of the items lost by the policyholder and their associated costs, CP server 212 may determine a final claim amount for the claim. CP server 212 may then apply the order cost to the final claim amount to reduce the final claim amount. Then CP server 212 may initiate a transfer of money to the policyholder based upon the final amount. In some embodiments, CP server 212 may transfer the money to a bank account associated with the policyholder. The bank account information may be contained in the user preferences. In other embodiments, CP server 212 may transfer the money to a payment card account associated with the policyholder. In some further embodiments, the payment card account may be provided to the policyholder after the event 115. The payment card account may contain the preliminary claim amount or a portion of that amount. CP server 212 may then reduce the amount in the payment card account based upon the order cost.

In some embodiments, the claim may be for a partial loss, for example several items may have been stolen from the policyholder's vehicle. In these embodiments, the first plurality of items that are in the order may be all of the items that were stolen from the vehicle. In these embodiments, CP server 212 may be able to purchase replacement items for the policyholder and potentially quickly resolve the claim.

Exemplary Client Device

Figure 4:
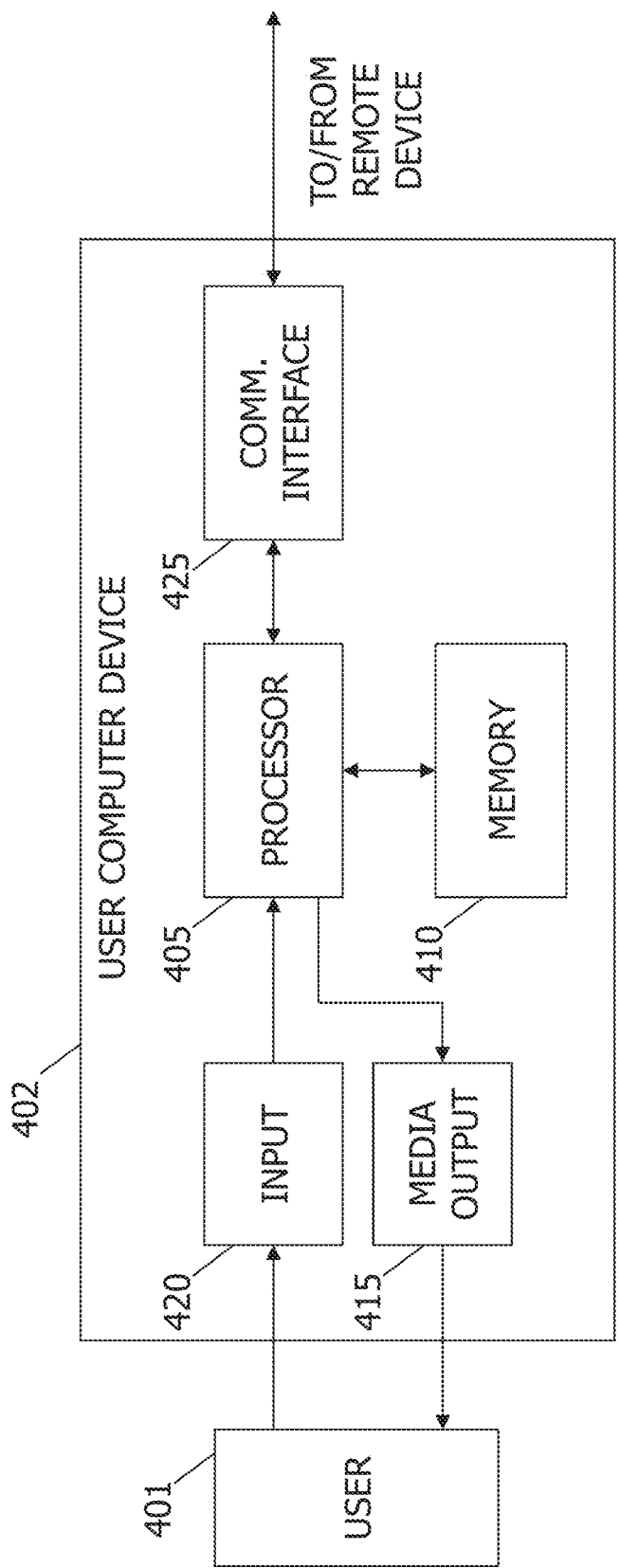
FIG. 4 illustrates an exemplary configuration of a client computer device shown in FIG. 2, in accordance with one embodiment of the present disclosure.

FIG. 4 depicts an exemplary configuration of a client computer device 214 shown in FIG. 2, in accordance with one embodiment of the present disclosure. User computer device 402 may be operated by a user 401. User computer device 402 may include, but is not limited to, client computer devices 214 (shown in FIG. 2). User computer device 402 may include a processor 405 for executing instructions. In some embodiments, executable instructions are stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an online store interface for viewing and/or purchasing items, and/or a wallet application for managing payment information. In some embodiments, user computer device 402 may include an input device 420 for receiving input from user 401. User 401 may use input device 420 to, without limitation, select and/or enter one or more items to purchase and/or a purchase request, or to access credential information, and/or payment information.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as CP server 212 (shown in FIG. 2). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from CP server 212. A client application allows user 401 to interact with, for example, CP server 212. For example, instructions may be stored by a cloud service, and the output of the execution of the instructions sent to the media output component 415.

Processor 405 executes computer-executable instructions for implementing aspects of the disclosure. In some embodiments, the processor 405 is transformed into a special purpose microprocessor by executing computer-executable instructions or by otherwise being programmed.

Exemplary Server Device

Figure 5:
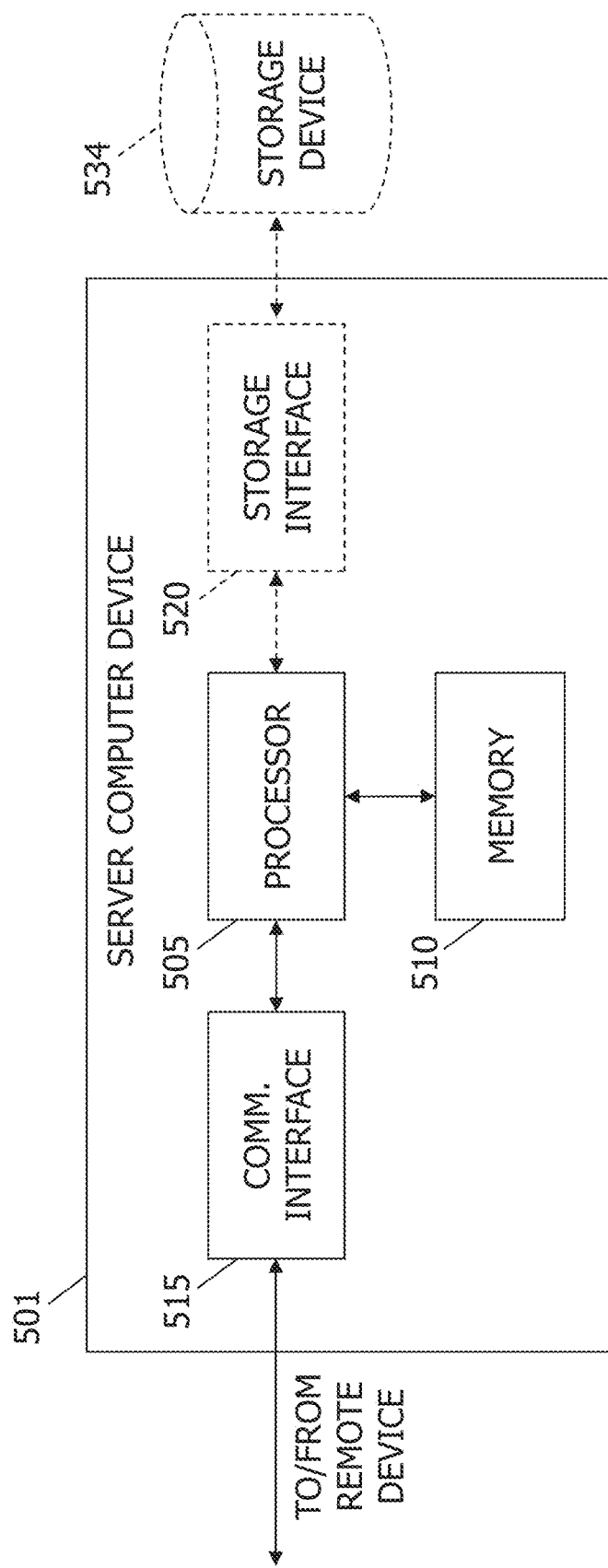
FIG. 5 illustrates an exemplary configuration of a server shown in FIG. 2, in accordance with one embodiment of the present disclosure.

FIG. 5 depicts an exemplary configuration of a server 212 shown in FIG. 2, in accordance with one embodiment of the present disclosure. Server computer device 501 may include, but is not limited to, database server 216, CP server 212, and ecommerce retailer server 228 (all shown in FIG. 2). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, ecommerce retailer server 228, or client computer devices 214 (shown in FIG. 2). For example, communication interface 515 may receive requests from client computer devices 214 via the Internet, as illustrated in FIG. 2.

Processor 505 may also be operatively coupled to a storage device 534. Storage device 534 may be any computer-operated hardware suitable for storing and/or retrieving data, such as, but not limited to, data associated with database 220 (shown in FIG. 2). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIG. 3.

Exemplary Computer Device

Figure 6:
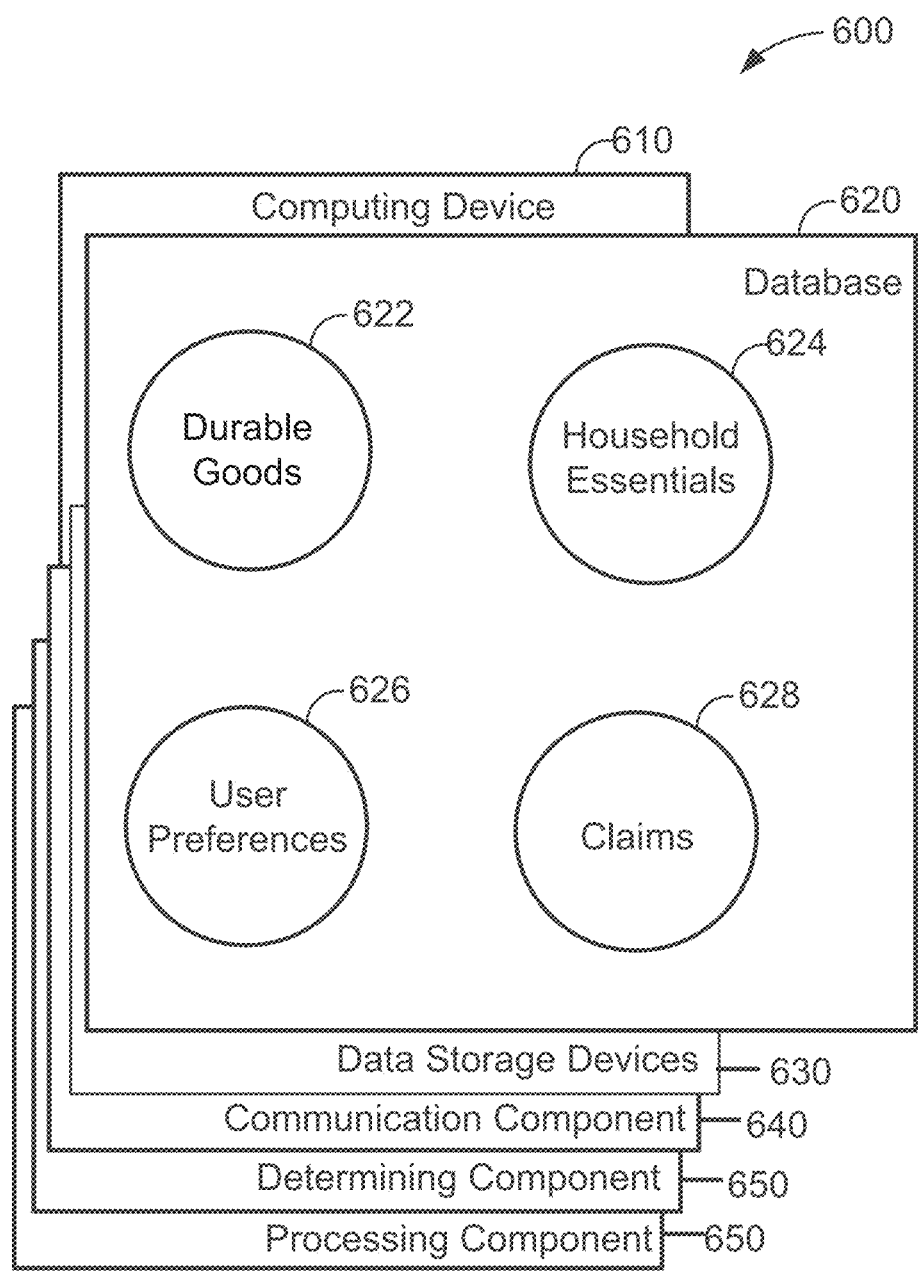
FIG. 6 illustrates a diagram of components of one or more exemplary computing devices that may be used in the system shown in FIG. 2.

FIG. 6 depicts a diagram 600 of components of one or more exemplary computing devices 610 that may be used in system 200 shown in FIG. 2. In some embodiments, computing device 610 may be similar to CP server 212 (shown in FIG. 2). Database 620 may be coupled with several separate components within computing device 610, which perform specific tasks. In this embodiment, database 620 may include listings of durable goods 622, household essentials 624, user preferences 626, and claims 628. In some embodiments, database 620 is similar to database 220 (shown in FIG. 2).

Computing device 610 may include the database 620, as well as data storage devices 630. Computing device 610 may also include a communication component 640 for receiving 305 a plurality of user preferences, receiving 310 a request from a user to cover a claim, and/or transmitting 320 an order (all shown in FIG. 3). Computing device 610 may also include a determining component 650 for determining 315 a first plurality of items for the user (shown in FIG. 3). A processing component 660 may assist with execution of computer-executable instructions associated with the system.

Exemplary Application

Figure 7:
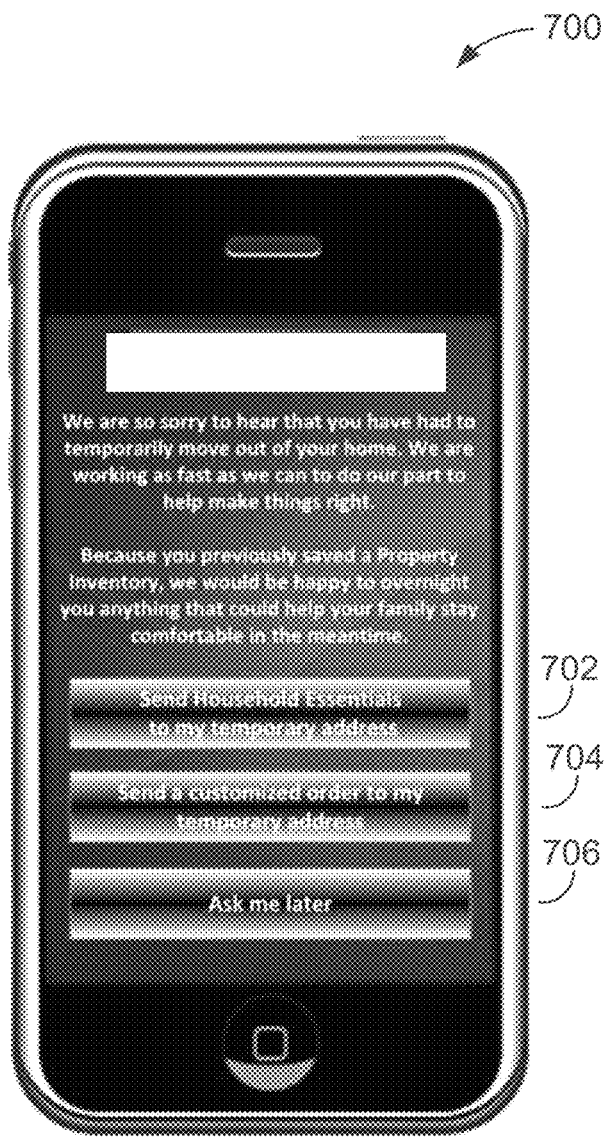
FIG. 7 depicts a mobile device application ("App") for use with the present personal property replacement service.

FIG. 7 depicts a mobile device application ("App") for use with the present personal property replacement service 700. The App may be provided by, or associated with, an insurance provider. The App may also be associated with users that have an associated virtual inventory of personal property on file with the insurance provider remote server. For instance, the virtual inventory of personal property may be built, with customer permission or affirmative consent (for instance, the customer may opt-in to an insurance rewards or other program), from computer analysis of mobile device images taken of the home, apartment, condo, and/or belongings therein, or from a history of purchases from an online retailer, or a brick and mortar retailer (e.g., physical department or grocery store). The App and/or the insurance provider remote server may determine that the customer was impacted (or potentially impacted) by an insurance-related event, such as by the insurance provider being contacted by the customer, or the customer's home having a GPS location within the path (defined by GPS coordinates) of an event (e.g., hurricane).

The mobile device App may present various information or options to the customer after it is determined that the customers have a partial or total loss. For instance, as depicted in FIG. 7, the App may present icons related to whether the customer wants the insurance provider to direct the shipment of household essentials from a retailer to their temporary address 702; send a customized order of goods to their temporary address 704; and/or whether they want a reminder sent later asking them again what items they would like to be sent to their temporary address 706. Other icons may be presented, and the icons may also be presented for partial loss events, with the goods being shipped to the customer's permanent or home address.

Exemplary Computer Network for Reordering Household Goods

Figure 8:
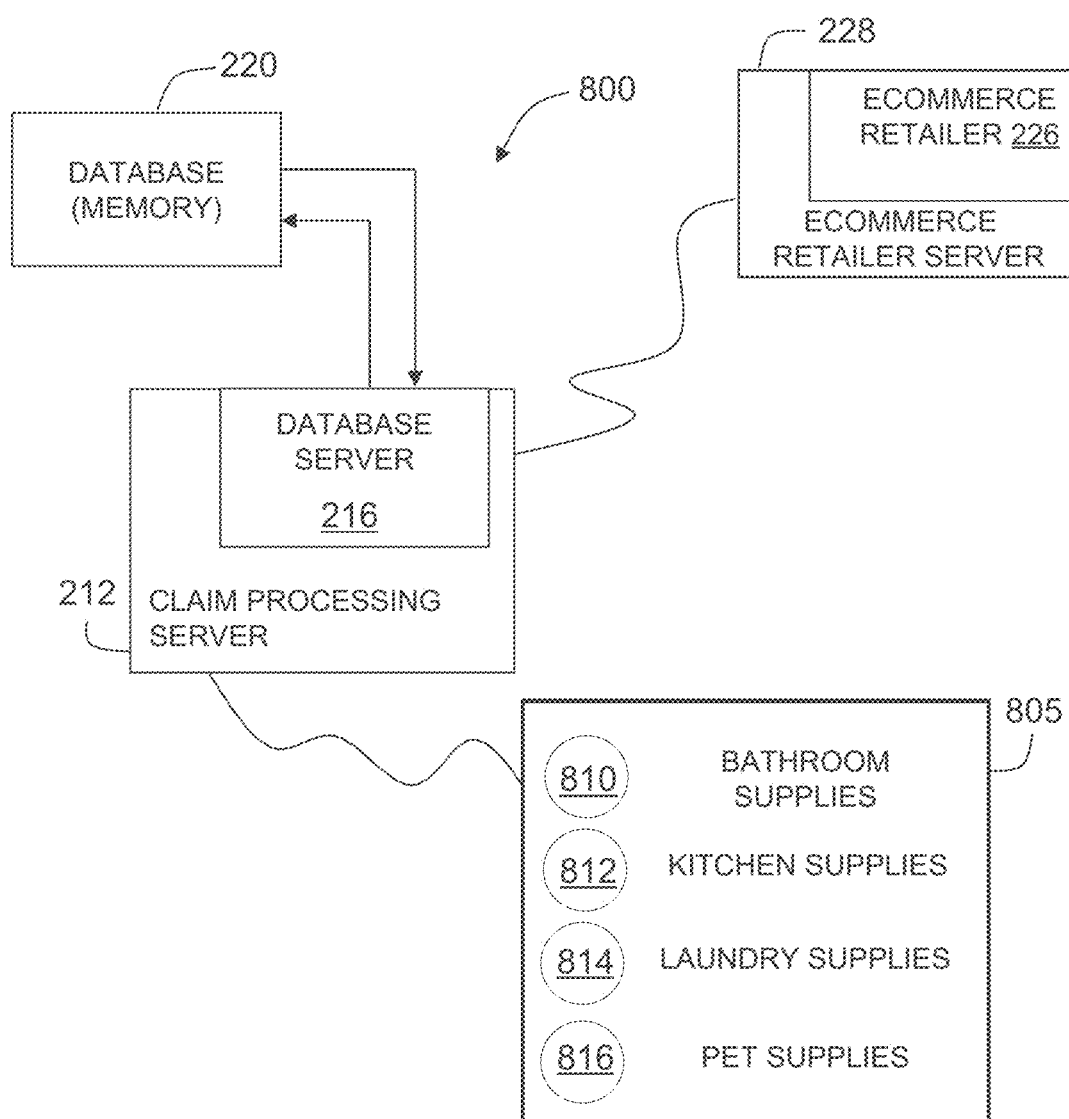
FIG. 8 illustrates a simplified block diagram of an exemplary system for reordering household goods in accordance with the process shown in FIG. 1.

FIG. 8 illustrates a simplified block diagram of an exemplary system 800 for reordering household essentials in accordance with process 100 shown in FIG. 1. In the exemplary embodiment, system 800 may be used for reordering the household goods that were previously determined to be needed by policyholder.

System 800 may include a remote ordering device 805. Remote ordering device 805 may be a physical device which is enabled to access CP server 212 using the Internet. More specifically, remote ordering device 805 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Remote ordering device 805 may include one or more buttons 810, 812, 814, and 816. Remote ordering device 805 may be capable of transmitting a signal to CP server 212 when one of buttons 810, 812, 814, and 816 is pressed. In the exemplary embodiment, remote ordering device 805 may be a computer device, such as user computer device 402 (shown in FIG. 4). Buttons 810, 812, 814, and 816 may be physical buttons or virtual buttons displayed on a screen of remote ordering device 805. The labels for buttons 810, 812, 814, and 816 on remote ordering device 805 may be physical labels, i.e., printed on remote ordering device 805, the labels may be virtual labels displayed on a screen of remote ordering device 805, and/or may the labels may be a combination of the two.

When bathroom supplies button 810 is pressed, remote ordering device 805 may be configured to transmit a signal to CP server 212 to instruct CP server 212 to reorder bathroom supplies, such as soap, shampoo, and toilet paper. Button 812 may cause kitchen supplies to be reordered, such as paper towels, paper plates, and dish soap. Button 814 may cause laundry supplies to be reordered, such as detergent and dryer sheets. Button 816 may cause pet supplies to be reordered, such as pet food, pet treats, and litter. When CP server 212 receives a signal from remote ordering device 805 that one of buttons 810-816 has been pressed, CP server 212 may place an order for the desired household goods through ecommerce retailer server 228 to be delivered to the user at an address associated with the user.

In the exemplary embodiment, CP server 212 may store ordering preferences for remote ordering device 805. The ordering preferences may include the quantity and brand of each item that is associated with one of the buttons on remote ordering device 805. In some embodiments, CP server 212 may be configured to reorder one week's worth of goods when a button is pressed. In other embodiments, each button may have a different period of time that the associated goods are for. For example, laundry supplies button 814 may cause one month's worth of supplies to be reordered, while pressing bathroom supplies button 810 may cause a week's worth of supplies to be reordered.

In some embodiments, CP server 212 may determine the types and quantities of goods to be ordered for each button. In other embodiments, the policyholder may configure the buttons on remote ordering device 805, potentially using client computer device 214 (shown in FIG. 2). Furthermore, policyholder may adjust stored reordering preferences using client computer device 214 to access CP server 212. In some embodiments, CP server 212 may use the policyholder's previous one-touch reordering information from a retailer to set-up the buttons on remote ordering device 805.

In the exemplary embodiment, remote ordering device 805 may be provided to policyholder as a part of the first shipment sent to policyholder's temporary address and allows policyholder to reorder household essentials. In at least one embodiment, remote ordering device 805 may be provided to policyholder before the first shipment of household essentials and may be used to initiate the first shipment.

Exemplary Embodiments & Functionality

In one embodiment, a computer system for enhanced personal property replacement for total and/or partial loss situations may be provided. The computer system may (i) build a virtual inventory of personal belongings, such as by performing object recognition techniques on mobile device digital images; (ii) receive a list of user preferences transmitted from the mobile device associated with a user; (iii) receive a request from the user to cover or handle an insurance claim after an insurance-related event damages a home partially or completely; (iv) determine a group of items to purchase for the user based upon the claim, the user preferences, and/or the extent of the home and personal belonging damage; and/or (v) transmit, to a retailer remote server a virtual order for the group of items to be delivered to the user at a temporary (such as a hotel) or permanent (home) address associated with the user. Insurance claim monies may be used to pay for the group of items. As a result, after an insurance-related event (e.g., fire, tornado, hurricane), household or other goods may be automatically purchased and delivered to a customer to alleviate the negative impact of the event on their life.

In some aspects, the present embodiments may relate to a computer-implemented method of handling loss of use and personal property claims that utilizes a combination of a personal property inventory, an online retailer (e.g., Amazon, eBay, etc.), a mobile/online application, and an altered money movement process in order to expedite and simplify the customer's experience. A virtual personal property inventory may be created. The method may include keying the items in the inventory to specific purchasable products on an online retailer. The categorization of those items may be set to distinguish between furniture and other durable goods (tables, chairs, refrigerators, televisions, washer, dryers, appliances, furs, jewelry, antiques, etc.), versus household essentials (light bulbs, paper towels, cleaning supplies, groceries, paper plates, plastic knives and forks, bottled water, soda, milk, orange juice, soup, food, etc.).

In the event of a claim affecting loss of use and/or personal property damage, the pre-set list(s) of items may be referenced and ordered from the online retailer according to pre-set preferences and/or customizable parameters (both of which may checked and re-set at the time of a claim or event). For example, someone living in temporary housing may elect to have a month's worth of "household essentials" ordered as a bundled set. Someone living in their new abode may elect to have two months' worth of household essentials ordered, as well as a sub-set of their previously selected furniture (e.g., a particular dining room set, a particular living room set, three beds and type of linen, type of television, etc.), or previously selected type of clothes (e.g., button down long-sleeved shorts, dress pants, blue jeans, etc.).

If these items were pre-selected, the customer may have a much simpler experience than having to shop for things per-item. This process may cycle through multiple iterations, all facilitated through the same process. For example, someone may place multiple orders for "household essentials," then some portion of their furniture/durable goods, and subsequently a complete set of furniture/durable goods at a later date.

A further enhancement may include a "budget" that allocates money into categories that help a customer spend the right amount on household goods, compared to the larger amount of money they will need to replace furniture, electronics (e.g., computers, televisions, etc.), antiques or paintings, and fixtures in their new or repaired home. This budget may serve a secondary purpose as a mechanism for fraud or buildup detection, and/or prevention (i.e., money being spent on goods other than those that should be replaced or are household essentials).

An additional component of the present embodiments may be a process whereby the insurance carrier and the online retailer coordinate together to make charges for the replacement of household goods against the balance of an estimated claim disbursement, rather than through the intermediary of a customer's credit card or bank account. The online retailer may also offer discounted pricing for these bulk orders (either to the customer, or to the insurance carrier). After this "emergency" period of debiting the claim disbursement, the remainder of the disbursement may be made to the customer, per the usual process (i.e., once claims settlement amounts are established, and the initial few weeks or days of the loss of use situation is ended). This may also be accomplished by issuing a unique debit card to a customer, allowing that person to "pay down" their eventual settlement balance in a way that is familiar to consumers.

In a further enhancement, the customer's order history with an online retailer may be kept or queried, to discover (and re-order) the exact item they had previously owned, perhaps for a full replacement (as opposed to a depreciated settlement amount). The bulk discount negotiated by the insurance provider may offset the "depreciated" value of the object, while providing a direct replacement (at no additional cost to the customer).

In a further enhancement, any partial loss could be considered, in addition to total losses. For example, the theft of personal property from a vehicle may be reported and automatically ordered, using the claims disbursement concept above. This may mimic the on-the-spot settlement of small claims that the business already does on a regular basis, but through the newly proposed method.

In a further enhancement, all retailers with whom a customer has transaction may be prompted to share information on purchases (and purchase patterns) executed by the customer over a given period of time (i.e., the last two years), as a way of populating an inventory of durable goods and typical volume of household essentials per time period (e.g., 3 packages of garbage bags a year). The prior purchasing patterns may also reveal preferred brands, volumes, and price rangers, which may be used to modulate the automatic ordering of goods during the loss of use period (even if no formal inventory was created by a customer).

In a further enhancement, the personal property inventory may be created from electronic image/video capture, when such capture includes automatic object recognition or machine learning. For instance, machine learning, such as object recognition, optical character recognition, combined learning, or pattern recognition techniques may be employed on digital images of a home and the items therein to identify home features, and type and quantify of personal belongings.

In a further enhancement, data from a "smart home" system (which reports data to a central station, including data on its connected components) may be the basis for automatic re-ordering of such a system (and all connected components—e.g., sensors, automatic locks).

In a further enhancement, data captured through time on a Wi-Fi network may be used as the basis for the identification, inventorying and replacement orders of computers, phones, tablets, other mobile devices, etc. that have been connected to that network. Automatic ordering of essentials following a homeowners or renters insurance claim that involves loss of use may be provided.

Also, configurable parameters for personal property replacement (e.g., customer preferences for timing, categories of goods, mailing location) may be provided—such data may be collected remotely via wireless communication from an App running on a customer mobile device. "Backend" handling of finances related to loss of use and personal property (e.g., drawing against claim disbursement amount directly, rather than eventually, after a customer has paid out-of-pocket expenses) may be provided. A debit/credit card that is explicitly designed to draw upon claim disbursements (current or future settlements) may also be provided to customers. Further, the practice of awarding "actual cash value" for losses up front, with a separate claims disbursement for "replacement cost" at a later date may be eliminated, and replaced with a one-step disbursement process instead of two-step disbursement.

In one aspect, a computer system for enhanced personal property replacement may be provided. The computer system may include at least one processor, sensor, and/or transceiver in communication with at least one memory device. The at least one processor, sensor, and/or transceiver may be programmed to: (1) generate a virtual inventory of personal belongings within an insured property associated with a user (such as (i) by obtaining lists of items bought from virtual or physical retailers over time, and/or (ii) by inputting mobile device or smart home controller image data into a trained machine learning program that is trained to detect types and quantities of household goods and other personal belongings within the insured property, the mobile device or smart home controller image data being received via wireless communication or data transmission over one or more radio frequency links); (2) receive user preferences for goods (detailing type or manufacturer of preferred household or other goods) transmitted from a mobile device associated with a user via wireless communication or data transmission over one more radio frequency links; (3) receive a request from the user to cover a claim (such as from the user's mobile device), or otherwise detect or determine that the insured property has been damaged by an insurance-related event and/or estimate an extent of damage to the insured property and/or the personal belongings therein (such as from inputting mobile device or smart home controller image data into a trained machine learning program that is trained to identify or estimate an amount of damage to the insured property and/or the personal belongings therein); (4) determine a list of items to purchase for the customer based upon (a) the claim, (b) the user preferences for goods, and/or (c) the extent of damage to the insured property and/or personal belonging estimated; and/or (5) transmit, to a retailer remote server associated with a retailer (such as via wireless communication or data transmission over one or more radio links), an order for the list of items (or at least some of the items therein) that are offered for sale by the retailer to direct the retailer to send the list of items to a preferred address associated with the user to facilitate getting household and/or other goods promptly to the customer after an event damages their primary dwelling. The list of items may be paid for out of a virtual account that includes monies or a fund created based upon the claim or the extent of damage to the insured property and/or personal belongings.

In another aspect, a computer-implemented method for enhanced personal property replacement for total or partial loss situations may be provided. The method may include: (1) generating, via one or more processors, a virtual inventory of personal belongings within an insured property associated with a user (such as by obtaining lists of items bought from virtual or physical retailers over time, and/or by inputting mobile device or smart home controller image data into a trained machine learning program that is trained to detect types and quantities of household goods and other personal belongings within the insured property, the mobile device or smart home controller image data being received via wireless communication or data transmission over one or more radio frequency links); (2) receiving, via the one or more processors and/or transceivers, user preferences for goods (detailing type or manufacturer of preferred household or other goods) transmitted from a mobile device associated with a user via wireless communication or data transmission over one more radio frequency links; (3) receiving, via the one or more processors and/or transceivers (such as via wireless communication or data transmission over one or more radio links), a request from the user to cover a claim (such as from the user's mobile device), or otherwise detect or determine that the insured property has been damaged by an insurance-related event and/or estimate an extent of damage to the insured property and/or the personal belongings therein (such as from inputting mobile device or smart home controller image data into a trained machine learning program that is trained to identify or estimate an amount of damage to the insured property and/or the personal belongings therein); (4) determining, via the one or more processors, a list of items to purchase for the customer based upon (a) the claim, (b) the user preferences for goods, and/or (c) the extent of damage to the insured property and/or personal belonging estimated; and/or (5) transmitting, via the one or more processors or transceivers, to a retailer remote server associated with a retailer (such as via wireless communication or data transmission over one or more radio links), an order for the list of items (or at least some of the items therein) that are offered for sale by the retailer to direct the retailer to send the list of items to a preferred address associated with the user to facilitate getting household and/or other goods to the customer promptly after an event damages their primary dwelling. The list of items may be paid for out of a virtual account that includes monies or a fund created based upon the claim or extent of damage to the insured property and/or personal belongings.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant personal belonging and/or home feature information for customers from mobile device sensors, vehicle-mounted sensors, home-mounted sensors, and/or other sensor data, vehicle or home telematics data, image data, and/or other data.

In one embodiment, a processing element may be trained by providing it with a large sample of conventional analog and/or digital, still and/or moving (i.e., video) image data, telematics data, and/or other data of belongings, household goods, durable goods, appliances, electronics, homes, etc. with known characteristics or features. Such information may include, for example, make or manufacturer and model information.

Based upon these analyses, the processing element may learn how to identify characteristics and patterns that may then be applied to analyzing sensor data, vehicle or home telematics data, image data, mobile device data, and/or other data. For example, the processing element may learn, with the customer's permission or affirmative consent, to identify the type and number of goods within the home, and/or purchasing patterns of the customer, such as by analysis of virtual receipts, customer virtual accounts with online or physical retailers, mobile device data, interconnect home data, interconnected vehicle data, etc. For the goods identified, a virtual inventory of personal items or personal articles may be maintained current and up-to-date. As a result, at the time of an event that damages the customer's home or goods, providing prompt and accurate service to the customer may be provided—such as accurate insurance claim handling, and prompt replacement of damaged items for the customer.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for enhanced personal property replacement, the computer system including at least one processor in communication with at least one memory device, the at least one processor is programmed to:

receive an insurance claim related to a primary residence of a user including a set of items to be replaced;

analyze a plurality of purchase histories to determine one or more items owned by the user;

in response to receiving the insurance claim and without further interaction with the user, determine a plurality of items for the user by performing a lookup in the at least one memory device the plurality of items including a replacement item for each item included in the set of items and the determined one or more items, wherein the lookup is performed using (i) a user identifier from the insurance claim and (ii) a plurality of user preferences stored in the at least one memory device, the plurality of items for items requiring replacement as a result of events related to the insurance claim; and without further interaction with the user, transmit, to a retailer computer device associated with a retailer of at least one of the determined plurality of items for the user, an electronic order message for the determined plurality of items with the retailer to be delivered to the user at an address associated with the user.

2. The computer system of claim 1, wherein the at least one processor is further programmed to:

receive wireless traffic from a Wi-Fi network associated with the user;

identify one or more devices connected to the Wi-Fi network to include the wireless traffic; and determine the plurality of items based upon the identified one or more devices.

3. The computer system of claim 1, wherein the at least one processor is further programmed to:

receive data from a smart home system associated with the user;

identify one or more components included in the smart home system based upon the data; and determine the plurality of items based upon the identified one or more components.

4. The computer system of claim 1, wherein the at least one processor is further programmed to:

receive one or more images of items owned by the user;

analyze the one or more images using one or more of object recognition, pattern recognition, and optical character recognition techniques; and determine the plurality of items based upon the analysis of the one or more images.

5. The computer system of claim 4, wherein the one or more images are at least one of an electronic image and a video.

6. The computer system of claim 1, wherein the plurality of user preferences include replacement preferences associated with one or more of a first plurality of items associated with the user, the first plurality of items including items used by the user at the primary residence of the user.

7. The computer system of claim 6, wherein the at least one processor is further programmed to:

determine a second plurality of items for the user based upon the insurance claim and the plurality of user preferences;

ship to the user a remote ordering device including a first button, wherein the first button is associated with the second plurality of items;

receive, from the remote ordering device, a signal indicating that the user pressed the first button; and transmit, to a retailer computer device associated with a retailer, an order for the determined second plurality of items with the retailer to be delivered to the user at the address associated with the user.

8. A computer-based method for enhanced personal property replacement, the method implemented on a claim processing ("CP") server including at least one processor in communication with at least one memory device, the method comprising:

receiving, at the CP server, an insurance claim related to a primary residence of a user including a set of items to be replaced;

analyzing a plurality of purchase histories to determine one or more items owned by the user;

in response to receiving the insurance claim and without further interaction with the user, determining, by the CP server, a plurality of items for the user by performing a lookup in the at least one memory device the plurality of items including a replacement item for each item included in the set of items and the determined one or more items, wherein the lookup is performed using (i) a user identifier from the insurance claim and (ii) a plurality of user preferences stored in the at least one memory device; and without further interaction with the user, transmitting, to a retailer computer device associated with a retailer of at least one of the determined plurality of items for the user, an electronic order message for the determined plurality of items with the retailer to be delivered to the user at an address associated with the user.

9. The method of claim 8 further comprising:
receiving wireless traffic from a Wi-Fi network associated with the user;
identifying one or more devices connected to the Wi-Fi network based upon the wireless traffic; and
determining the plurality of items based upon the identified one or more devices.

10. The method of claim 8 further comprising:
receiving data from a smart home system associated with the user;
identifying one or more components included in the smart home system based upon the data; and
determining the plurality of items based upon the identified one or more components.

11. The method of claim 8 further comprising:
receiving one or more images of items owned by the user;
analyzing the one or more images using one or more of object recognition, pattern recognition, and optical character recognition techniques; and
determining the plurality of items based upon the analysis of the one or more images.

12. The method of claim 11, wherein the one or more images are at least one of an electronic image and a video.

13. The method of claim 8, wherein the plurality of user preferences include replacement preferences associated with one or more of a first plurality of items associated with the user, the first plurality of items including items used by the user at the primary residence of the user.

14. The method of claim 13 further comprising:
determining a second plurality of items for the user based upon the insurance claim and the plurality of user preferences;
shipping to the user a remote ordering device including a first button, wherein the first button is associated with the second plurality of items;
receiving, from the remote ordering device, a signal indicating that the user pressed the first button; and
transmitting, to a retailer computer device associated with a retailer, an order for the determined second plurality of items with the retailer to be delivered to the user at the address associated with the user.

15. At least one non-transitory computer-readable storage media having computer-executable instructions embodied thereon, wherein when executed by at least one processor, the computer-executable instructions cause the processor to:

receive an insurance claim related to a primary residence of a user including a set of items to be replaced;

analyze a plurality of purchase histories to determine one or more items owned by the user;

in response to receiving the insurance claim and without further interaction with the user, determine a plurality of items for the user by performing a lookup in at least one memory device the plurality of items including a replacement item for each item included in the set of items and the determined one or more items, wherein the lookup is performed using (i) a user identifier from the insurance claim and (ii) a plurality of user preferences stored in the at least one memory device; and without further interaction with the user, transmit, to a retailer computer device associated with a retailer of at least one of the determined plurality of items for the user, an electronic order message for the determined plurality of items with the retailer to be delivered to the user at an address associated with the user.

16. The computer-readable storage media of claim 15, wherein the computer-executable instructions further cause the processor to:
receive wireless traffic from a Wi-Fi network associated with the user;
identify one or more devices connected to the Wi-Fi network based upon the wireless traffic; and
determine the plurality of items based upon the identified one or more devices.

17. The computer-readable storage media of claim 15, wherein the computer-executable instructions further cause the processor to:
receive data from a smart home system associated with the user;
identify one or more components included in the smart home system based upon the data; and
determine the plurality of items based upon the identified one or more components.

18. The computer-readable storage media of claim 15, wherein the computer-executable instructions further cause the processor to:
receive one or more images of items owned by the user, wherein the one or more images are at least one of an electronic image and a video;
analyze the one or more images using one or more of object recognition, pattern recognition, and optical character recognition techniques; and
determine the plurality of items based upon the analysis of the one or more images.

19. The computer-readable storage media of claim 15, wherein the plurality of user preferences include replacement preferences associated with one or more of a first plurality of items associated with the user, the first plurality of items including items used by the user at the primary residence of the user.

20. The computer-readable storage media of claim 19, wherein the computer-executable instructions further cause the processor to:
determine a second plurality of items for the user based upon the insurance claim and the plurality of user preferences;
ship to the user a remote ordering device including a first button, wherein the first button is associated with the second plurality of items;

receive, from the remote ordering device, a signal indicating that the user pressed the first button; and transmit, to a retailer computer device associated with a retailer, an order for the determined second plurality of items with the retailer to be delivered to the user at the address associated with the user.

\* \* \* \* \*